US007831040B2

(12) United States Patent
Lindemann et al.

(10) Patent No.: US 7,831,040 B2
(45) Date of Patent: *Nov. 9, 2010

(54) DES HARDWARE THROUGHPUT FOR SHORT OPERATIONS

(75) Inventors: Mark Lindemann, Pleasantville, NY (US); Ronald Perez, Mount Kisco, NY (US); Sean William Smith, Hanover, NH (US)

(73) Assignee: International Business Machines Corporation, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 12/106,520

(22) Filed: Apr. 21, 2008

(65) Prior Publication Data

US 2009/0034719 A1 Feb. 5, 2009

Related U.S. Application Data

(63) Continuation of application No. 10/276,163, filed as application No. PCT/US01/13927 on Apr. 30, 2001, now Pat. No. 7,362,863.

(60) Provisional application No. 60/201,002, filed on May 1, 2000.

(51) Int. Cl.
*H04L 9/00* (2006.01)
(52) U.S. Cl. .............................. 380/29; 380/28; 380/30; 380/33; 380/44; 380/47; 380/259
(58) Field of Classification Search ................. 380/259, 380/28–30, 44, 47, 33
See application file for complete search history.

(56) References Cited

U.S. PATENT DOCUMENTS

| 4,964,164 | A | * | 10/1990 | Fiat .............................. 380/30 |
| 5,548,648 | A | * | 8/1996 | Yorke-Smith ................ 713/193 |
| 5,850,443 | A | * | 12/1998 | Van Oorschot et al. ....... 380/285 |
| 5,953,418 | A | * | 9/1999 | Bock et al. ................... 380/240 |
| 5,966,448 | A | * | 10/1999 | Namba et al. .................. 380/33 |
| 6,330,653 | B1 | * | 12/2001 | Murray et al. ............... 711/173 |
| 6,393,565 | B1 | * | 5/2002 | Lockhart et al. ............. 713/172 |
| 6,438,678 | B1 |   | 8/2002 | Cashman et al. |

FOREIGN PATENT DOCUMENTS

| JP | 06-197146 | | 7/1994 |
| JP | 06197146 | * | 7/1994 |
| JP | 08-278750 | | 10/1996 |
| JP | 10-105449 | | 4/1998 |

OTHER PUBLICATIONS

English Abstract for Publication No. 06-197146.

* cited by examiner

*Primary Examiner*—Kambiz Zand
*Assistant Examiner*—Tongoc Tran
(74) *Attorney, Agent, or Firm*—F. Chau & Associates, LLC

(57) ABSTRACT

A symmetric key cryptographic method is provided for short operations. The method includes batching a plurality of operation parameters (1503), and performing an operation according to a corresponding operation parameter (1505). The symmetric key cryptographic method is a Data Encryption Standard (DES) method. The short operations can be less than about 80 bytes. The short operations can be between 8 and 80 bytes. The method includes reading the batched parameters from a dynamic random access memory (1504), and transmitting each operation through a DES engine according to the operations parameter (1505).

7 Claims, 11 Drawing Sheets

DES HARDWARE THROUGHPUT FOR SHORT OPERATIONS

CROSS-REFERENCE TO RELATED APPLICATION

This is a Continuation Application of U.S. application Ser. No. 10/276,163 filed on Jun. 6, 2003 now U.S. Pat. No. 7,362,863, which is a National Stage Entry of International Application No. PCT/US2001/13927, filed Apr. 30, 2001, which claims the benefit of U.S. Provisional Application Ser. No. 60/201,002, filed May 1, 2000, the disclosures of which are herein incorporated by reference in their entirety.

BACKGROUND OF THE INVENTION

1. Field of the Invention

The present invention relates to cryptographic support, and more particularly to cryptographic support for short operations.

2. Discussion of Prior Art

Data Encryption Standard (DES) is a widely-used method of data encryption using private keys. There are 72 quadrillion or more possible encryption keys under the DES that can be used for protecting packets between parties over electronic networks. For each packet or message, a key is chosen at random. Like other symmetric key cryptographic methods, both the sender and receiver need to know and use the same private key.

DES applies a 56-bit key to each 64-bit block of data. The process can run several modes and includes 16 rounds of operations. Although this is considered strong encryption, many companies use triple-DES (TDES), which applies three keys in succession to each packet.

DES originated at IBM in 1977 and was adopted by the U.S. Department of Defense. It is specified in the ANSI X3.92 and X3.106 standards and in the Federal Information Processing Standards (FIPS) 46 and 81 standards.

Typically, cryptographic methods focus on large packets (greater than about 80 bytes). However, when a DES system is used for smaller packets, the performance may drop by an order of magnitude.

Therefore a need exists for a system and method of cryptographic support for DES operations which has high throughput for long (>80 bytes) and shorter packets.

SUMMARY OF THE INVENTION

According to an embodiment of the present invention, a symmetric key cryptographic method is provided for short operations. The method includes batching a plurality of operation parameters, and performing an operation according to a corresponding operation parameter. The symmetric key cryptographic method is a Data Encryption Standard (DES) method. The short operations can be less than about 80 bytes. The short operations can be between 8 and 80 bytes.

The method includes batching the plurality of operation parameters and a plurality of DES operation into a single request, calling DES for each operation in the request, and performing DES for each operation separately according to the corresponding operation parameter.

The method further includes batching the plurality of operation parameters and a plurality of DES operations into a single request, calling DES for the batched operations, and performing DES for each operation separately according to the corresponding operation parameter. Each request is performed with a chip reset, a key and an initialization vector. Calling the DES for the batched operations further comprises switching a context for the batched operations. The context switch is between an application layer and a system software layer.

The method includes reading the batched parameters from a dynamic random access memory, and transmitting each operation through a DES engine according to the operations parameter.

According to an embodiment of the present invention, a method is provided for improved DES short operation throughput. The method includes batching a plurality of operation parameters, each operation parameter corresponding to an operation, reading the batched operation parameters into a dynamic random access memory, and transmitting each operation through a DES engine according to the operations parameter. The DES is external-to-external and an output for each operation is transmitted separately. The short operation can be less than about 80 bytes. The short operation can be between 8 and 80 bytes.

According to an embodiment of the present invention, a symmetric key cryptographic method is provided for operations between about 8 and about 80 bytes in length. The method includes providing a key index to an engine, and pumping the operations through the engine in bulk wherein a central processing unit does not handle the bytes. The engine is a DES engine.

The method includes resetting an engine chip for an operation, reading an initialization vector, and loading the initialization vector into the engine chip. The method further includes determining a key from the key index, loading the key into the engine chip, and reading a data length for the operation.

The method includes transmitting the data length through an Input channel into the engine chip, and transmitting the data length through an Output channel. The channels are FIFOs.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

The present invention provides a system and method for cryptographic support which has high throughput for long and short DES operations. According to an embodiment of the present invention, the system includes a multi-chip embedded module, packaged in a Peripheral Component Interconnect (PCI) card. In addition to cryptographic hardware and circuitry for tamper detection and response, a general-purpose computing environment is provided including a central processing unit, and executing software stored in ROM and/or Flash memory.

Figure 1:
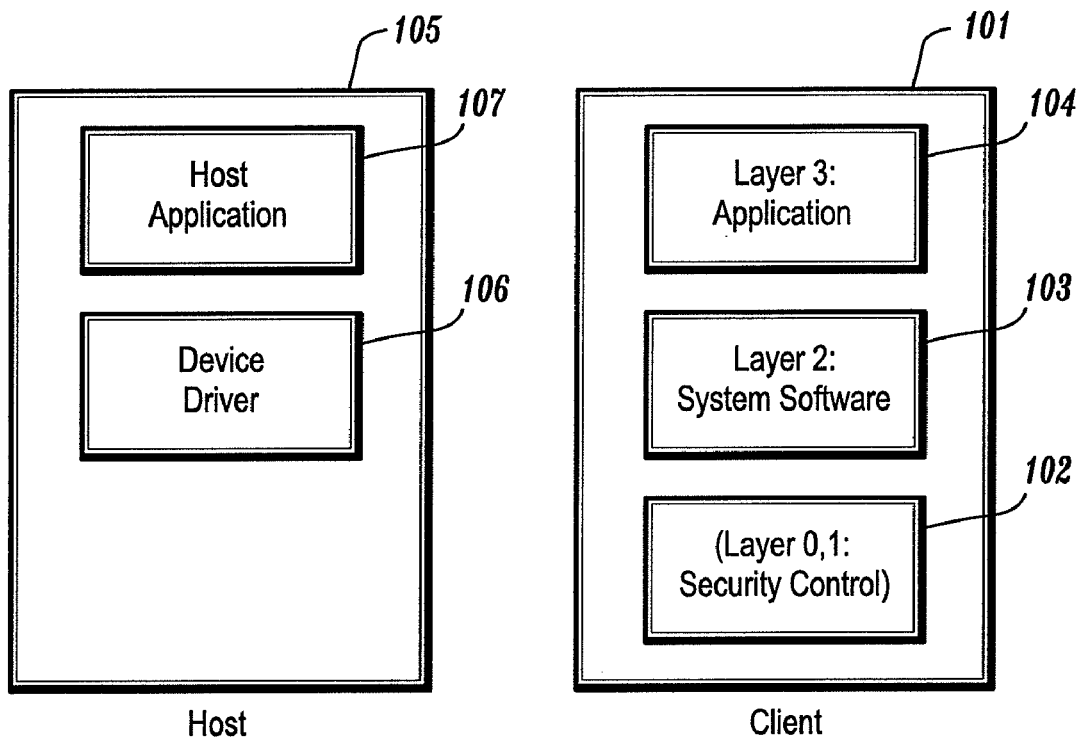
FIG. 1 is a diagram of the DES architecture according to an embodiment of the present invention.

Referring to FIG. 1, the multiple-layer software architecture of the client 101 and the host 105 is shown. The client-side includes foundational security control in Layers 0 and 1 102, a supervisor-level software system in Layer 2 103, and a user-level software application in Layer 3 104. Layer 2 103 supports application development. Within Layer 2 103, a kernel provides the operating system abstractions of multiple processes and address spaces; these abstractions support independent managers, which handle cryptographic hardware and other input/output (I/O) on the bottom, and provide higher-level application program interfaces (APIs) to the Layer 3 application 104. An API is the specific method prescribed by a computer or by another program by which a programmer writing an application program can make requests of the operating system or another application. Typically, the Layer 3 application 104 in turn provides an abstraction of its own API to a host-side application 107.

Figure 2:
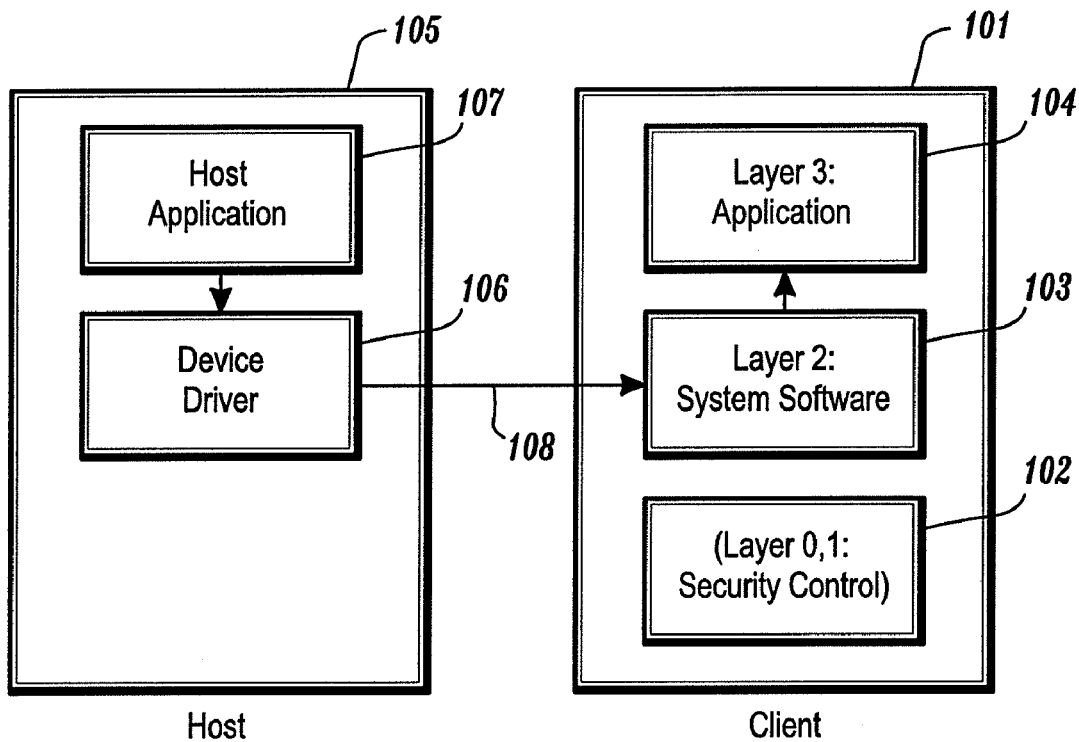
FIG. 2 is another diagram of the DES architecture according to an embodiment of the present invention.

The host-side 105 includes a device driver 106 and a host application 107. According to FIG. 2, for the Layer 3 application 104 to use a service provided by the card-side application, the host-side application 107 issues a call to the host-side device driver 106. The device driver 105 opens an sccRequest 108 to the Layer 2 system 103 on the device. Layer 2 103 informs the Layer 3 application 104 resident on the device of the existence of the request, and the parameters the host sent along with the request.

Figure 3:
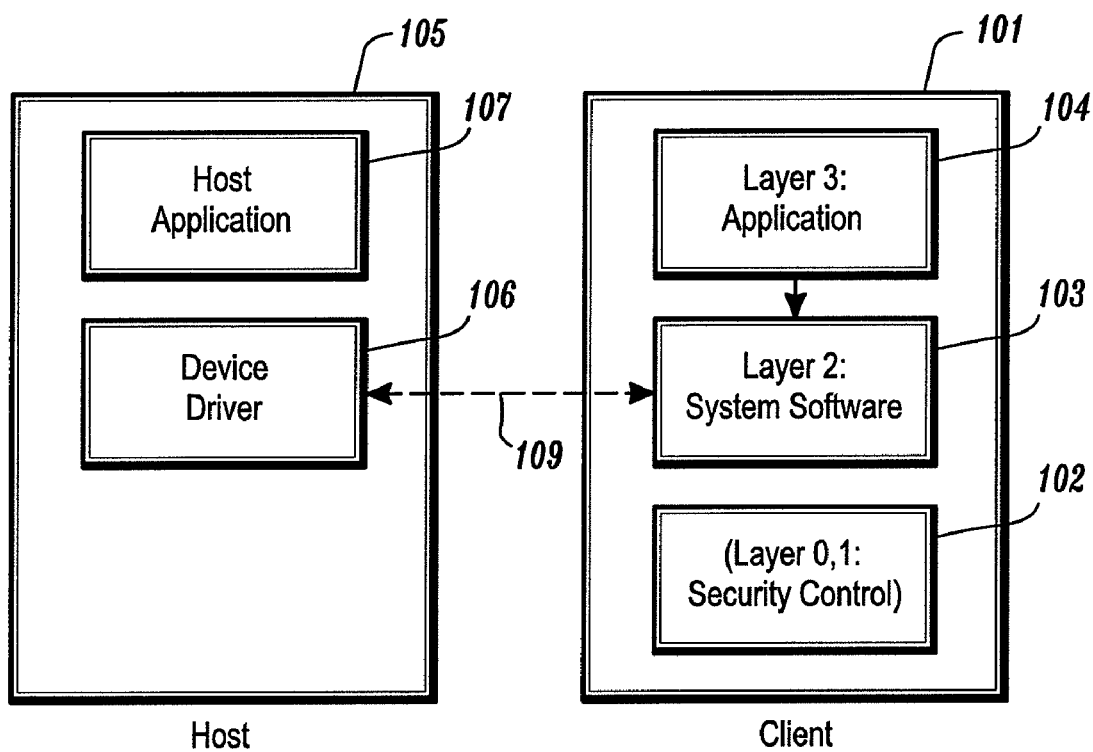
FIG. 3 is still another diagram of the DES architecture according to an embodiment of the present invention.
Figure 4:
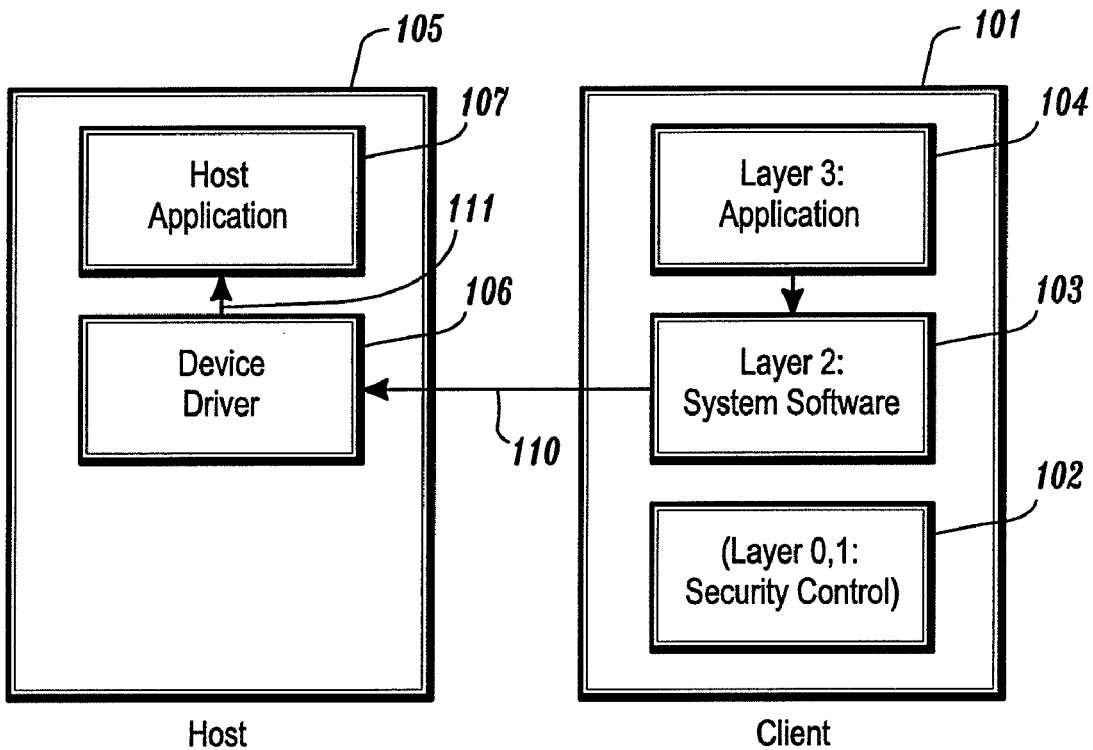
FIG. 4, is yet another diagram of the DES architecture according to an embodiment of the present invention.

According to FIGS. 3 and 4, the Layer 3 application 104 handles the host application's request for service, for example, it can direct Layer 2 103 to transfer data 109 to the device driver 106 and perform the needed cryptographic operations. The Layer 3 application 104 closes out the sccRequest 110 and sends the output back 111 to the host application 107.

According to an embodiment of the present invention, a device for fast cryptography is provided. The device includes a coprocessor having a central processing unit (CPU), at least two levels of internal software and at least three data paths. The software levels can include an operation system or kernel level and an application level. The data paths can include an external to internal memory and/or CPU path, an internal memory and/or CPU to a symmetric engine path, and a channel between the external system and the symmetric engine. The channel can be a first-in first-out (FIFO). According to an embodiment of the present invention, the device includes a FIFO state machine. The FIFO state machine structure transports or drives data into and out of the method engine.

It should be noted that while the present invention is presented in terms of a symmetric cryptographic function (e.g., DES), the invention contemplates any parameterized function on variable length data. Thus, DES is provided as an example of an embodiment of the present invention and given the teachings of the present invention provided herein, one of ordinary skill in the related art will be able to contemplate these and similar implementations or configurations of the present invention.

Figure 5:
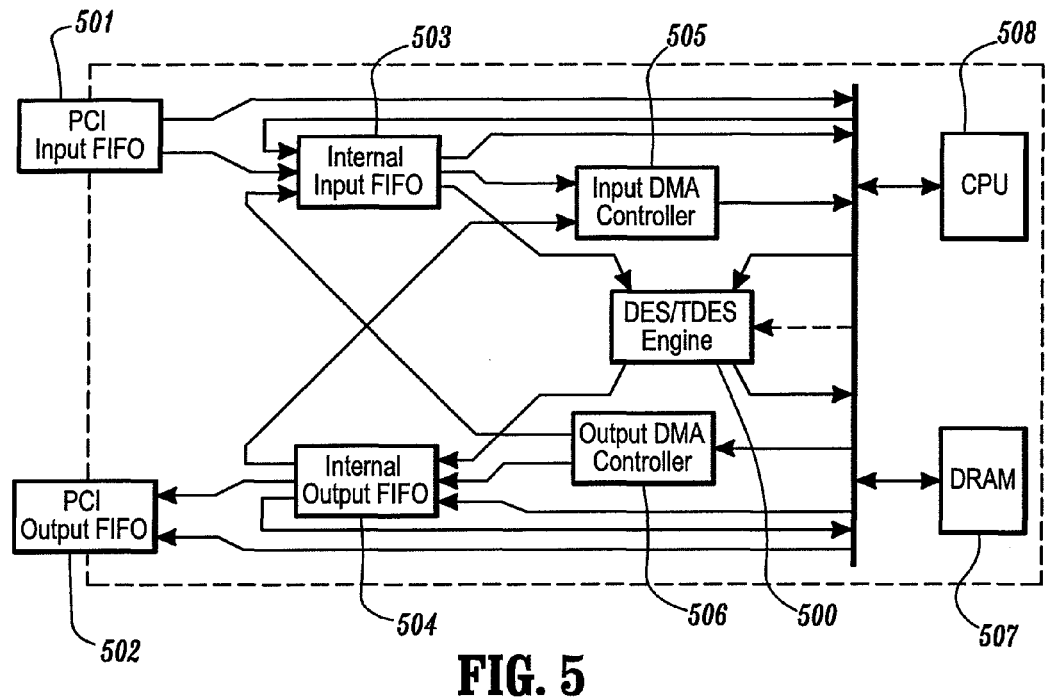
FIG. 5 is a diagram of the FIFO structure supporting DES/TDES with a coprocessor according to an embodiment of the present invention.

Referring to FIG. 5, the FIFO structure works with the DES/TDES engine 500. The present invention is described according to an IBM 4758 coprocessor, specifically Models 002/023 PCI cryptographic coprocessors, however, given the teachings of the present invention provided herein, one of ordinary skill in the related art will be able to contemplate these and similar implementations or configurations.

In Model 2 hardware, the FIFO structure also supports fast Secure Hash Algorithm 1 (SHA-1); though the structure may be applied to any method engine.

For both input and output, two pairs of FIFOs 501-504, a PCI FIFO pair 501-502 and an internal FIFO pair 503-504 are provided for external and internal transfer, respectively, as well as a Direct Memory Access (DMA) controller 505-506 for CPU-free transfer into and out of internal dynamic random access memory (DRAM) 507.

The internal CPU 508 selects which data paths to activate, and what key, initialization vector (IV), and other operational parameters the DES engine 500 may use, via control registers (not shown). The IV is generated by a random number generator, typically included in the Layer 2 system, and combined with the unencrypted text and the key. The key is a variable value applied to a block of unencrypted text to produce encrypted text.

Configurations of the DES engine 500 include bulk external-to-external DES (shown in FIG. 8), bulk internal-to-internal DES (output DMA 506 to internal input FIFO 503 to DES 500, then back through the Internal Output FIFO 504 and PCI Output FIFO 502), and DMA transfer (e.g., PCI input FIFO 501 to internal input FIFO 503 to input DMA 505 and from the Output DMA Controller 506 to the Internal Output FIFO 504 and to the PCI Output FIFO 502). Further, the DES hardware can be configured in a bypass mode in which the commercial Layer 2 system does not use the hardware.

One constraint on the system is that either both internal FIFO-DES paths need be selected (bulk mode), or neither is to be selected. Another constraint is that the FIFO configurations cannot be altered until data transfer is paused, and the state machine driving the FIFOs will transfer data asynchronously until resources are exhausted.

Figure 6:
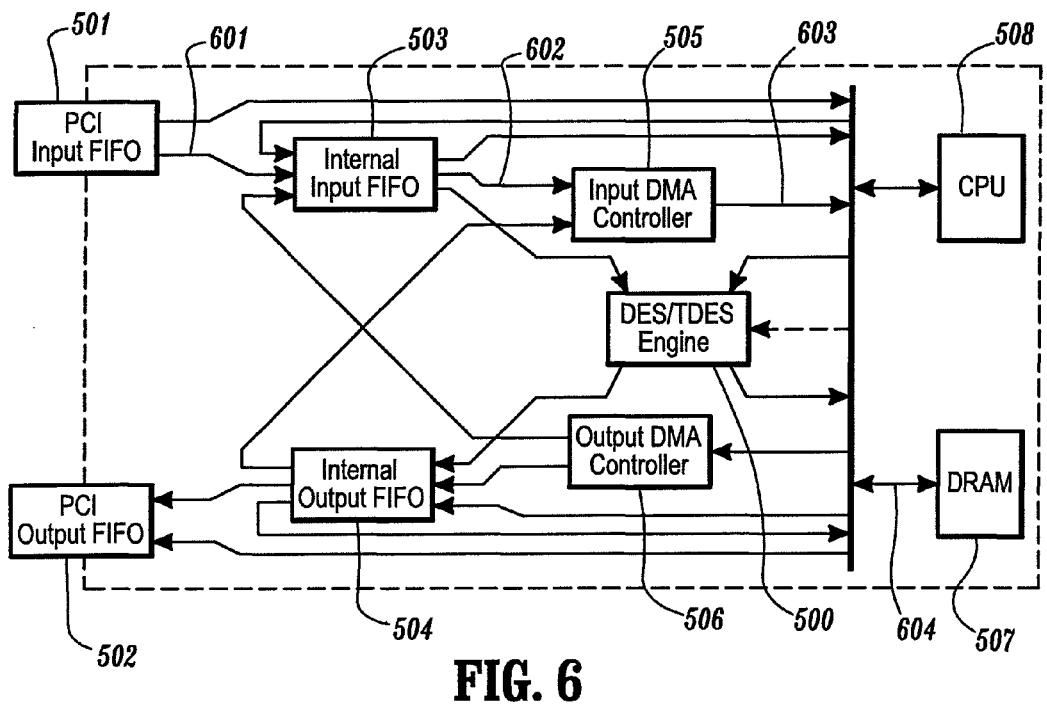
FIG. 6 is another diagram of the FIFO structure supporting DES/TDES with a coprocessor according to an embodiment of the present invention.

The internal CPU 508 can configure the FIFO hardware to support card applications in various ways. For example, FIG. 6 depicts a configuration in which the FIFOs bring data into the card via the DMA, such as when the host application opens up a sccRequest to the card application. Data passes from the PCI Input FIFO 501 to the Internal Input FIFO 503 via 601, to the Input DMA Controller 505 via 602, to the DRAM 507 via 603 and 604.

Figure 7:
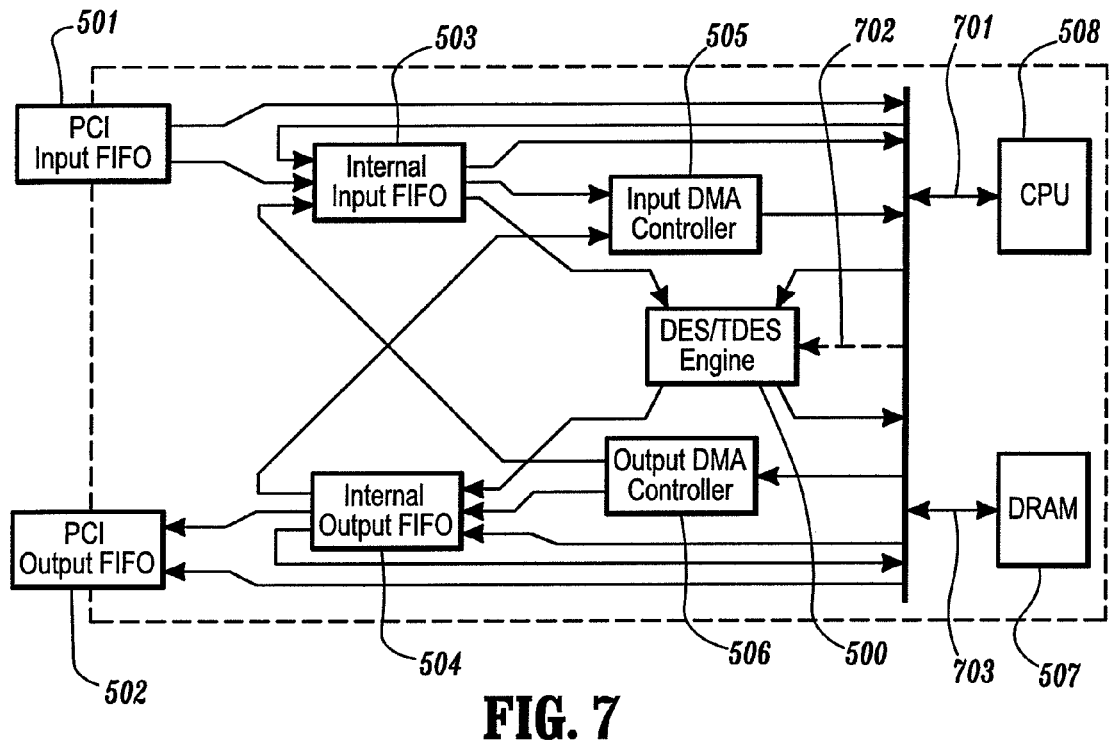
FIG. 7 is still another diagram of the FIFO structure supporting DES/TDES with a coprocessor according to an embodiment of the present invention.

Referring to FIG. 7 depicting a DES request, the card may transfer the operational parameters from the DRAM 507 into the DES chip 500. The internal CPU 508 loading operational parameters into the DES chip 500 from the DRAM 507 via lines 701-703.

Figure 8:
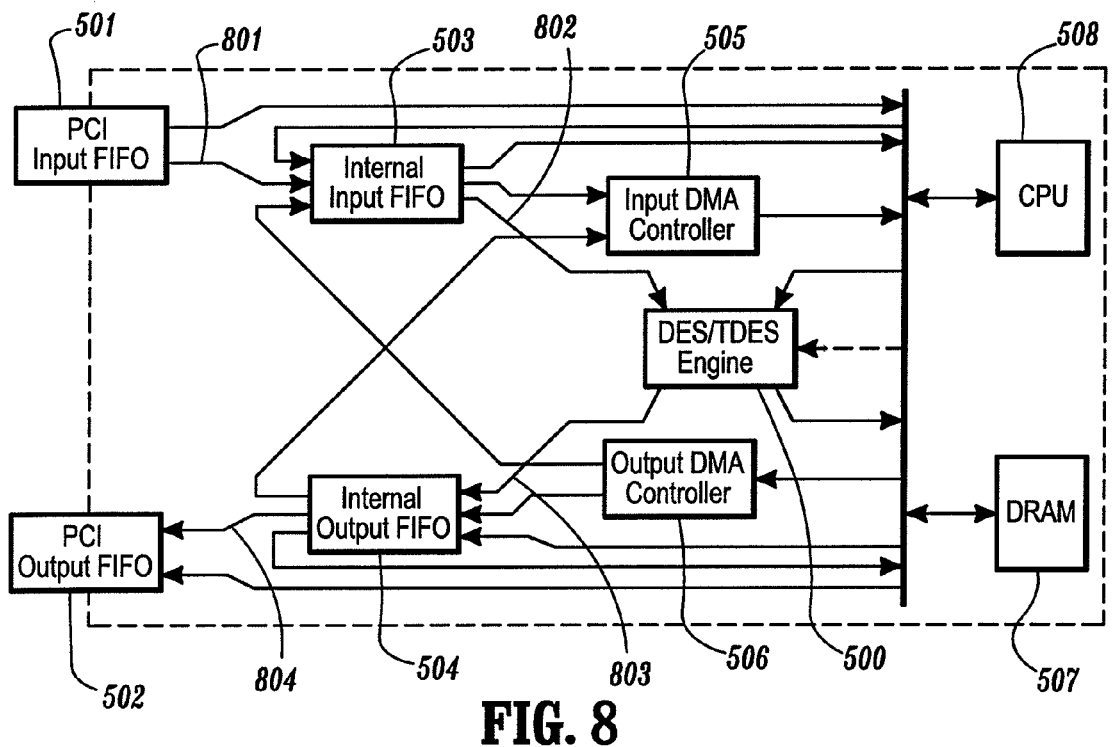
FIG. 8 is yet another diagram of the FIFO structure supporting DES/TDES with a coprocessor according to an embodiment of the present invention.
Figure 9:
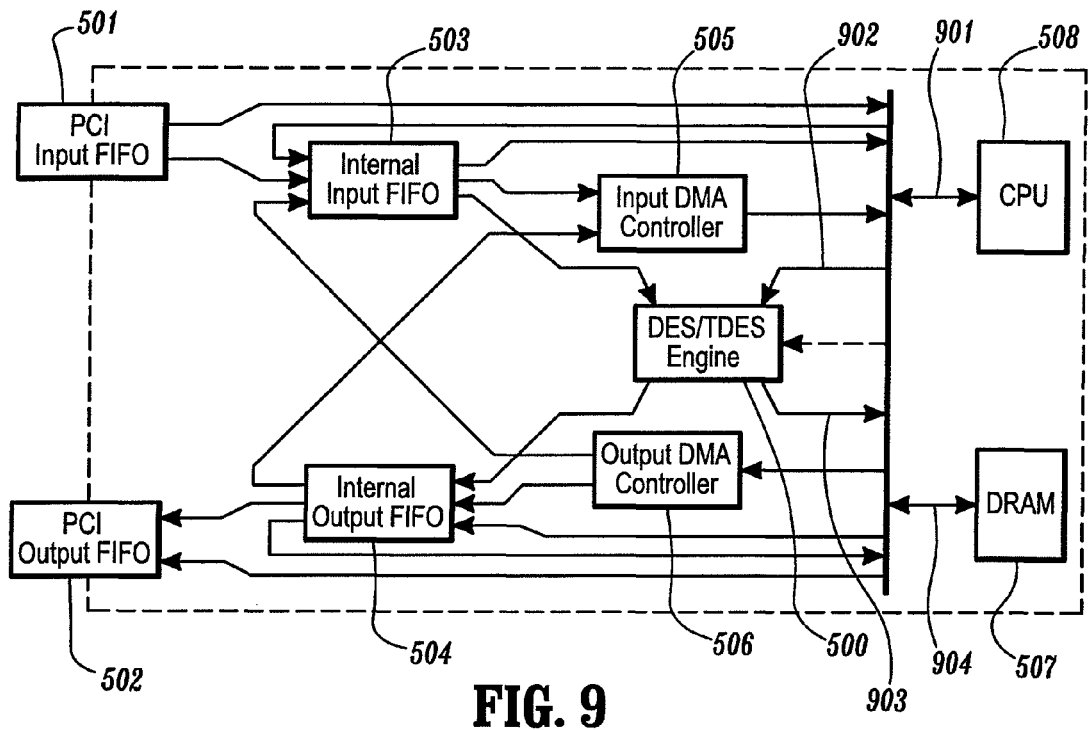
FIG. 9 is a further diagram of the FIFO structure supporting DES/TDES with a coprocessor according to an embodiment of the present invention.

According to FIG. 8, if the DES request is for external-to-external DES, the card will configure the FIFOs to bring the data in from the host, through the DES chip 500 and back to the host. The CPU 508 can configure the FIFOs 501-504 to stream data from the host, through the DES chip and back to the host via lines 801-804.

Additionally, if the DES request is for internal-to-internal DES and is determined to be too short for DMA, the card may manually push the data bytes through. The CPU 508 can drive data from the DRAM 507 through the DES/TDES engine via programmed I/O and lines 901-904.

Figure 10:
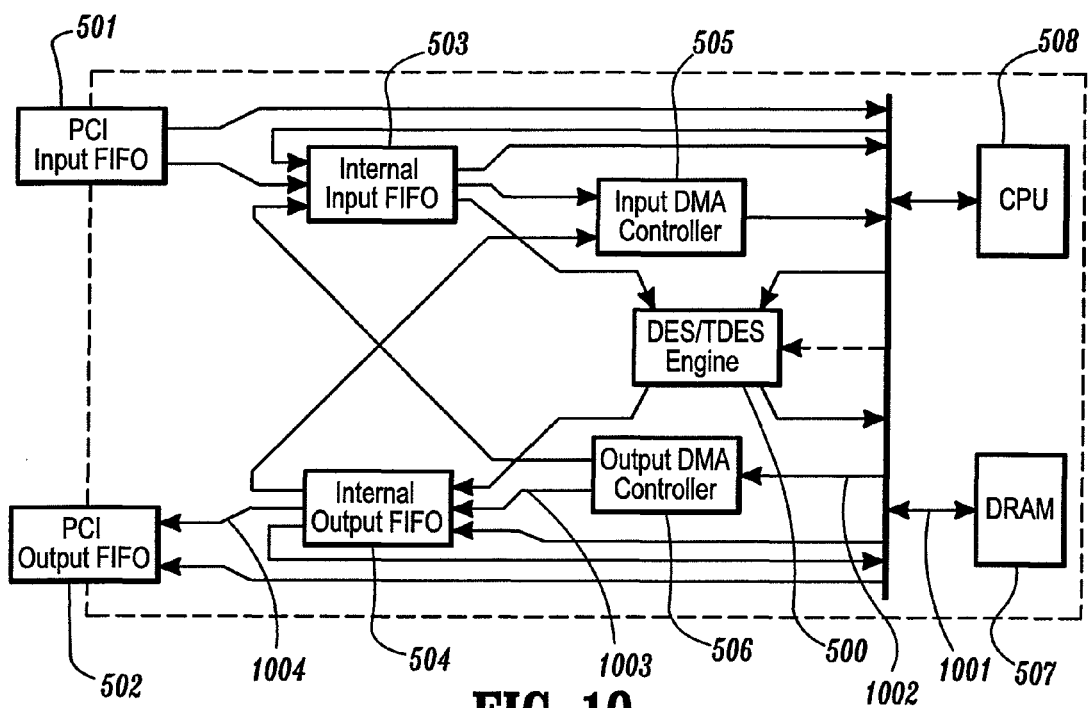
FIG. 10 is a diagram of the FIFO structure supporting DES/TDES with a coprocessor according to an embodiment of the present invention.

As depicted in FIG. 10, when the sccRequest is complete, the card may send the results back to the host via DMA. The internal CPU 508 can configure the FIFOs to send data from the DRAM 507 back to the host via the DMA and lines 1001-1004.

Figure 16:
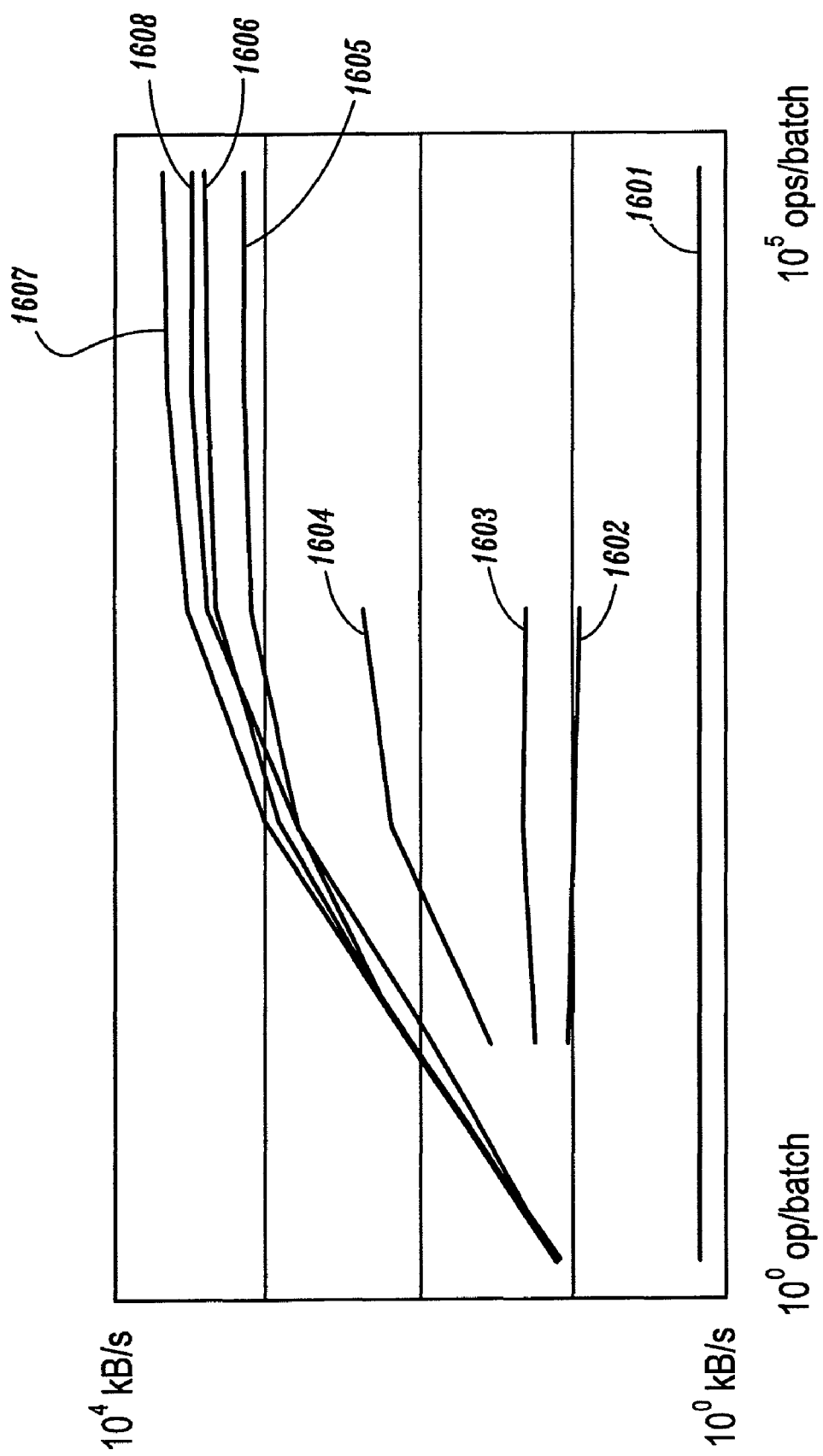
FIG. 16 is a graph illustrating DES speeds for various embodiments of the present invention.

The present invention proposes methods for increasing the throughput of short DES operations. The methods used for evaluating the present invention included, DES operations including cipher block chaining (CBC) encrypt and CBC-decrypt, with data sizes distributed uniformly at random between 8 and 80 bytes. Chaining is a method which depends the decryption of a block of cipher text on all preceding blocks. The IVs and keys changed with each operation; the keys are triple-DES (TDES) encrypted with a master key stored inside the device. Encrypted keys, IVs and other operational parameters are sent in with each operation, but are not counted as part of the data throughput. Although the keys may change with each operation, the total number of keys is small, relative to the number of requests. Referring to FIG. 16, the speeds obtained for DES operations are shown for various embodiments of the present invention. Using Model 1 hardware a speed indicated by 1601 was achieved.

Figure 11:
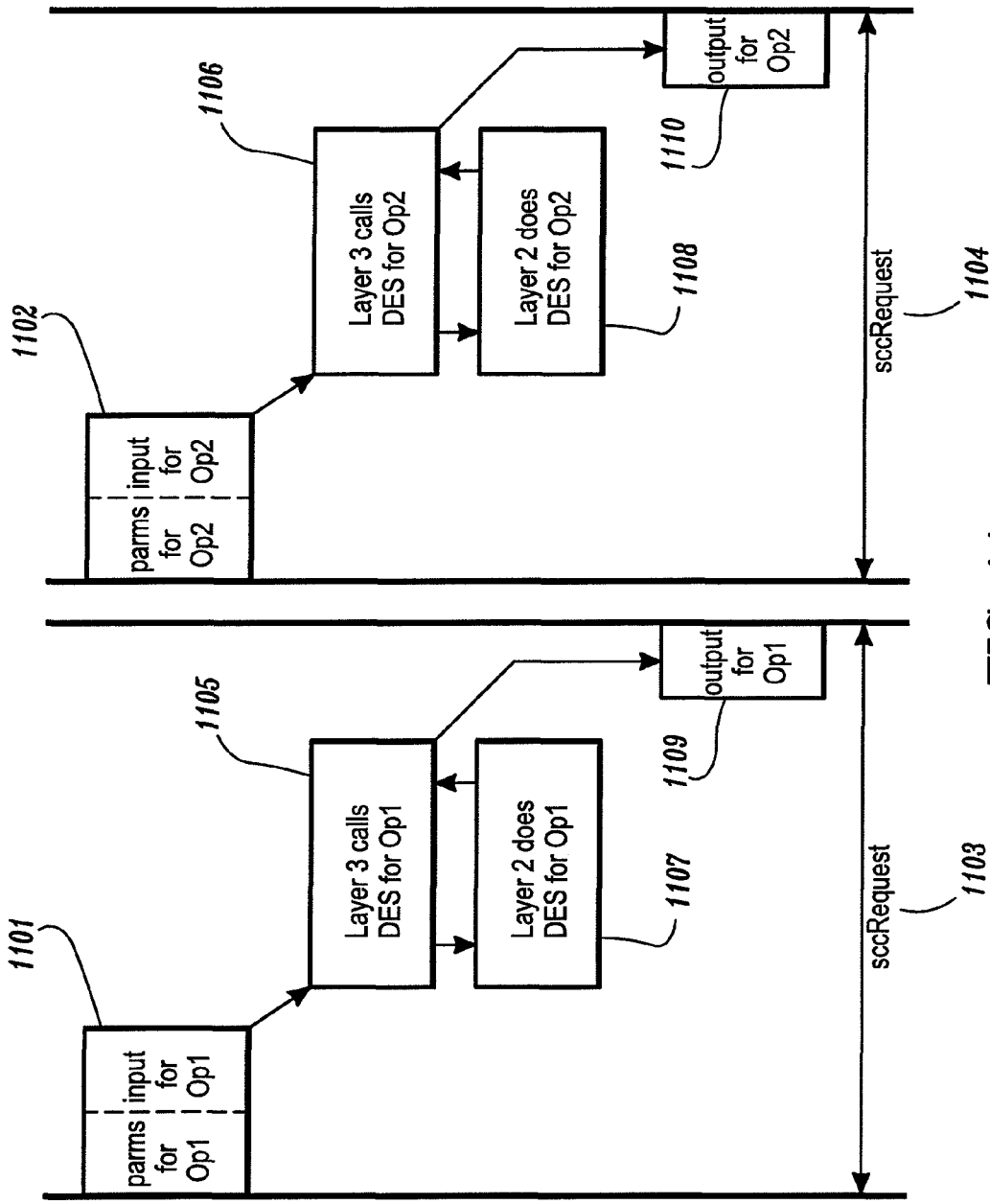
FIG. 11 is a flow diagram of an application handling two operations as separate sccRequests according to the prior art.

A baseline implementation was established using a Model 2 prototype for the following embodiments. According to FIG. 11, the host application handles each operation 1101-1102 as a separate sccRequest 1103-1104 with Programmed Input/Output (PIO) DES. The implementation includes the host application which generates sequences of short-DES requests (cipher key, IV, data) and the card-side application. The card-side application catches each request, unpacks the key, sends the data, key, and IV to the DES engine, and sends the results back to the host. Keys were randomly chosen over a set of cipher keys. Caching keys inside the card reduced the extra TDES key decryption step and increased the speed 1602.

Figure 12:
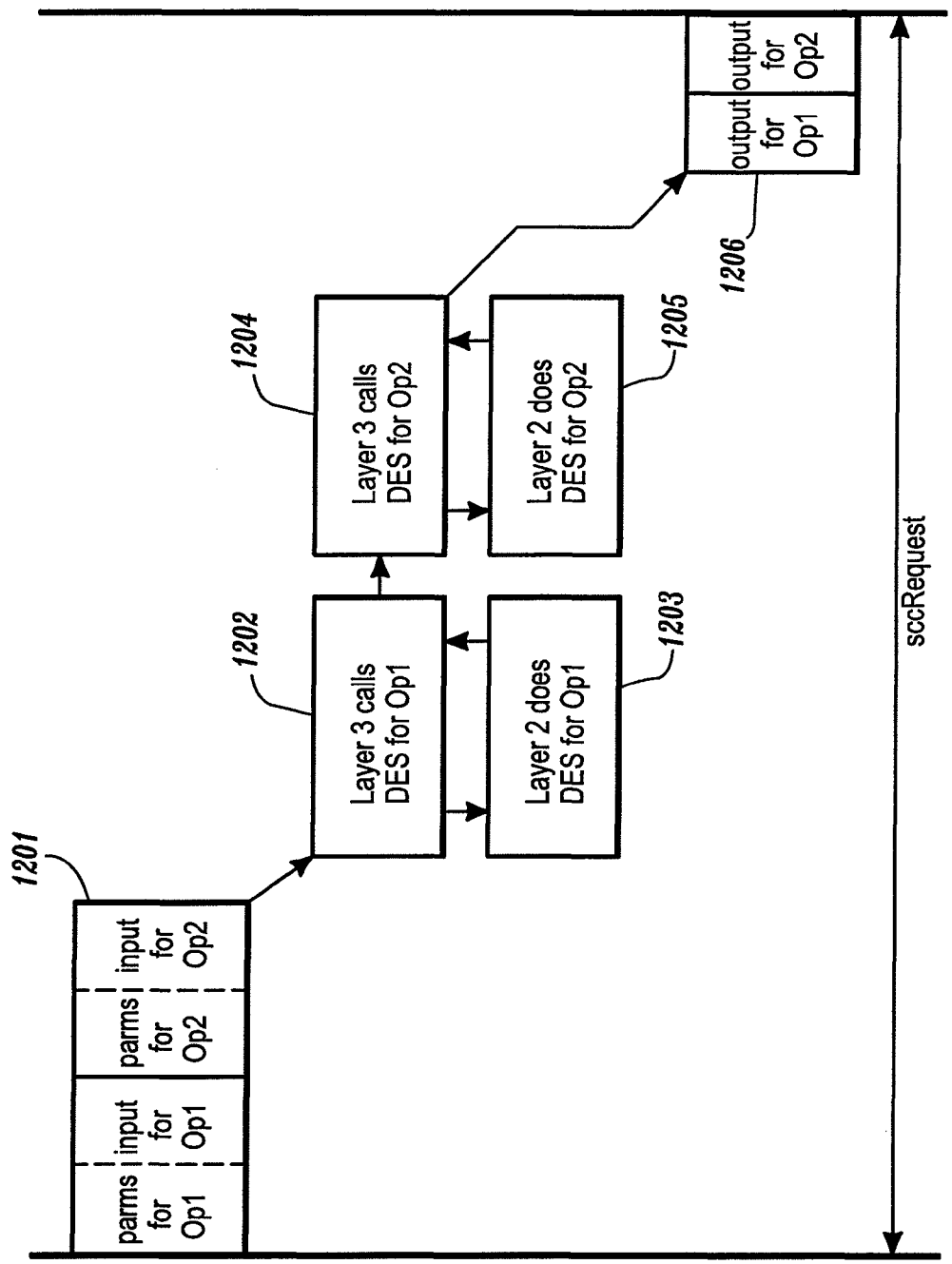
FIG. 12 is a flow diagram illustrating a batched host-card interaction according to an embodiment of the present invention.

According to an embodiment of the present invention, the short-DES performance can be enhanced by reducing the host-card interaction. Referring to FIG. 12, this includes batching a large sequence of short-DES requests into one sccRequest 1201. The card-side application was modified accordingly to receive the sequence in one step, process each operation 1202-1205, and send the concatenated output back to the host in one step 1206. The Layer 3 application calls DES for each operation 1202 and 1204. Layer 2 performs the DES for each operation separately 1203 and 1205. Speeds obtained for the benchmark data above where between about 18 to 23 kilobytes/second and up to 40 kilobytes/second with key catching 1603.

According to an embodiment of the present invention, by eliminating the DES chip reset for each operation the short-DES performance may be increased 1604. By generating a sequence of short-DES operation requests that all use one key, one direction (decrypt or encrypt), and IVs of zero (although the IVs may be arbitrary), a speed of about 360 kilobytes/second can be achieved. The card-side application receives the operation sequence and sends the operation sequence to the Layer 2 system. In Layer 2, a modified DES Manager (the component controlling the DES hardware) sets up the chip with the key and an IV of zero, and transmits the data through the chip. The end of each operation, the DES Manager performs an exclusive-or (XOR) to break the chaining. For example, for encryption, the software manually XOR's the last block of cipher text from the previous operation with the first block of plain text for the operation, in order to cancel out the XOR that the chip would do.

Figure 13:
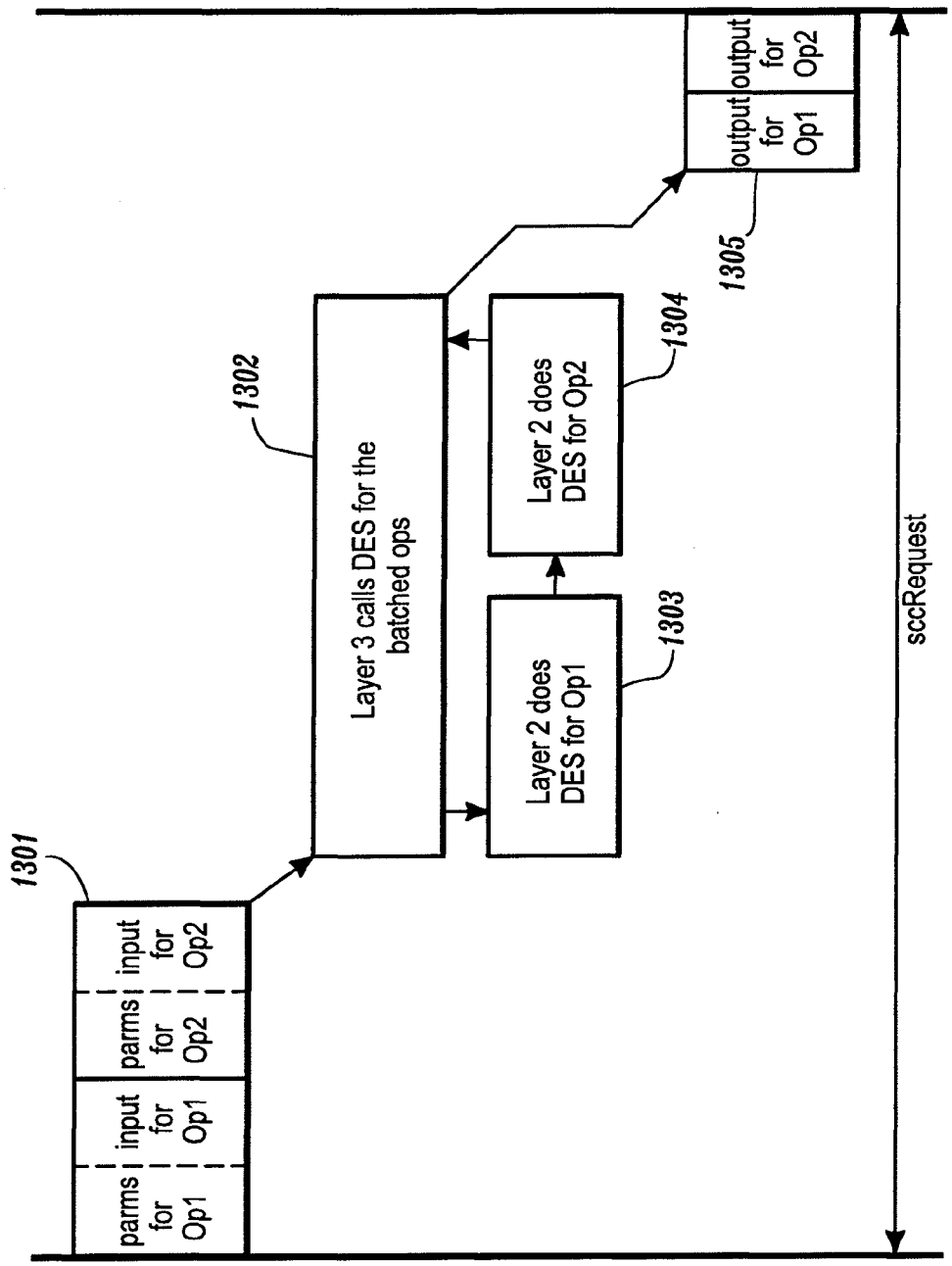
FIG. 13 is a flow diagram of multiple operations batched into a single call according to an embodiment of the present invention.

According to the batching method, besides reducing the number of chip resets, the number of context switches between the Layer 3 and Layer 2 is reduced from O(n) to O(1), where n is the number of operations in the batch. Referring to FIG. 13, according to another embodiment of the present invention, by using the multi-key, non-zero-IV setup (results shown as 1603), the card-side application 1302 was altered to send batched requests 1301 to a modified DES Manager (Layer 2) 1303-1304, thus reducing the number of context switches. The card-side application 1302 calls DES for the batched operations. The modified DES Manager 1303-1304 processes each request with a chip reset and a new key and IV. The requests are sent to the host 1305. The results obtained using the modified DES Manager 1303-1304 are shown as 1604 in FIG. 16.

According to yet another embodiment of the present invention, the FIFO state machine pumps data bytes through DES in a bulk mode. Thus, the CPU does not handle the data bytes. According to the prior methods, each byte of the cipher key, IV, and data was handled many times. The bytes came in via FIFOs and DMA into the DRAM with an initial sccRequest buffer transfer. The CPU takes the bytes out of DRAM and puts them into the DES chip. The CPU takes the data out of the DES chip and puts it back into DRAM. The CPU sends the data back to the host through the FIFOs. Accordingly, by reducing the number of data transfers the throughput can be increased 1605. Key unpacking is eliminated as a built-in part of the API. Each application may have a unique method of unpacking, making the API unpacking redundant. Within each application an initialization step concludes with a plain text key table resident in the device DRAM. The operation lengths were standardized to 40 bytes. In addition, the host application was modified to generate sequences of requests that include an index into the internal key table, instead of a cipher key. Thus, the card-side application 1401 calls the modified DES Manger 1402 and 1407 and makes the key table 1403 and 1408 available to it, rather than immediately bringing the request sequence from the PCI Input FIFO into DRAM. For each operation the modified DES Manager 1402 and 1407 resets the DES chip; reads the IV and loads it into the chip; reads and sanity checks the key table, looks up the key, and loads it into the chip; and reads the data length for the operation. The modified DES Manager sets up the state machine to transmit that number of bytes through the Input FIFOs into the DES chip then back out the Output FIFOs 1404-1406 and 1409-1411. The card-side application closes out the request 1412. The results are shown as 1605 in FIG. 16.

Figure 14:
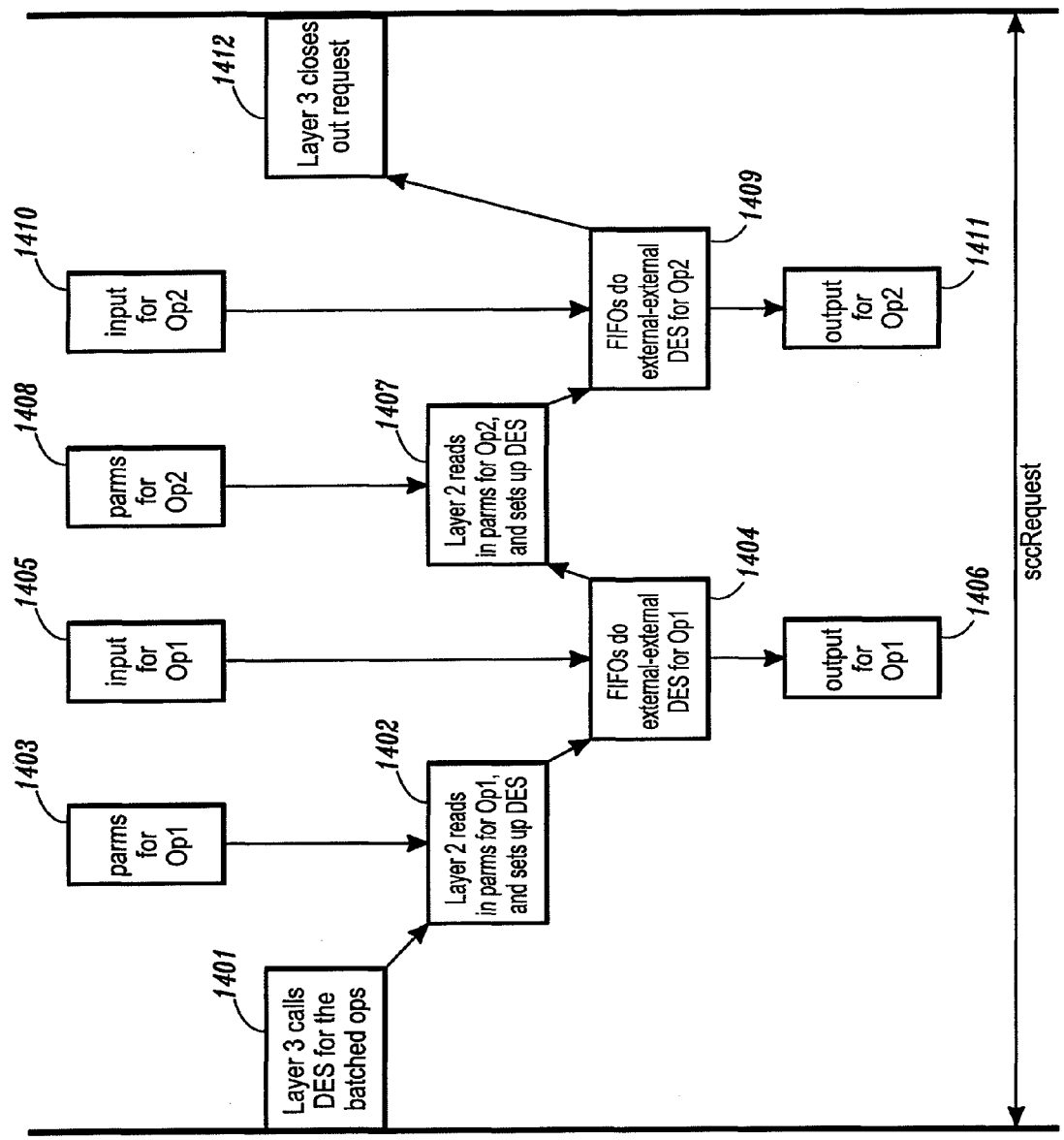
FIG. 14 is a flow diagram of a method which reduces data transfers for each operation according to an embodiment of the present invention.

According to an embodiment of the present invention, The number of Industry Standard Architecture (ISA) I/O instructions was increased (doubled) which reduced the throughput by half, showing a correlation between the ISA I/O instructions and the throughput speed. The modified DES Manager described above (with respect to 1605 and FIG. 14) was then modified to use memory-mapping I/O ports instead of ISA I/O when available (the hardware used did not provide memory mapped I/O ports for all instances). The software was also modified to eliminate any spurious FIFO reads caused by certain state machine polling intermittently. The results are shown as 1606 in FIG. 16.

Figure 15:
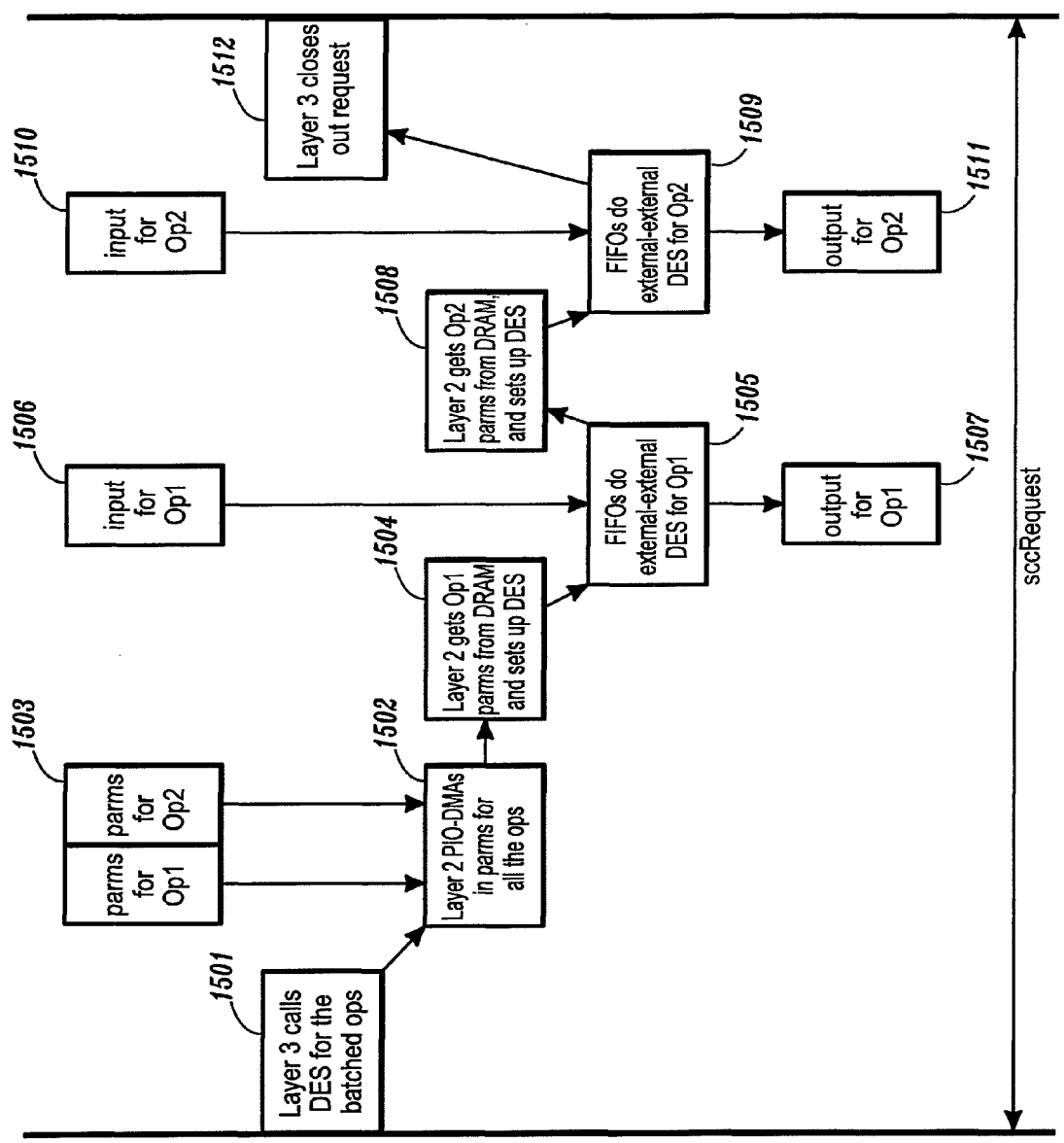
FIG. 15 is a flow diagram of a method which batches parameters for all operations into a block according to an embodiment of the present invention.

Referring to FIG. 15, by batching the parameters together, the parameters can be read via memory-mapped operations, allowing modification of the FIFO configuration and the processing of the data. Layer 3 calls DES for the batched operations 1501. The host application batches the per-operation parameters into one group 1503, attached to the input data. The modified DES Manager sets up the Internal FIFOs and the state machine to read the batched parameters, by-passing the DES chip 1502; reads the batched parameters via memory-mapped I/O from the Internal Output FIFO into DRAM 1504 and 1508; reconfigures the FIFOs; and, using the buffered parameters, sets up the state machine and the DES chip to transmit each operation's data 1506 and 1510 from the input FIFOs, through the DES, then back out the Output FIFOs 1505, 1507 and 1509 and 1511. Layer 3 closes out the request 1512. The results are shown in 1607 in FIG. 16. The accuracy of the method may be increased by accessing the IV and data length registers through the ISA method 1608.

According to the present invention, the short-DES speed can be determined according to the following relationship:

$$\frac{C_1 \cdot \text{Batches} + C_2 \cdot \text{Batches} \cdot \text{Ops} + C_3 \cdot \text{Batches} \cdot \text{Ops} \cdot \text{DataLen}}{\text{Batches} \cdot \text{Ops} \cdot \text{DataLen}}$$

where Batches is the number of host-card batches, Ops is the number of operations per batch, DataLen is the average data length per operation, and $C_1$, $C_2$, and $C_3$ are unknown constants representing the per-batch per-operation and per-byte overheads, respectively.

The present invention contemplates eliminating the per-batch overhead $C_1$ by modifying the host device driver-Layer 2 interaction to enable indefinite sccRequest, with added polling or signaling to indicate when additional data is ready for transfer. The per-operation overhead $C_2$ may be reduced by minimizing the number of per-operation parameter transfers. For example, the host application may, within a batch of operations, interleave parameter blocks that assert arguments such as, the next N operations all use a particular key. This method eliminates bringing in and reading the key index for each iteration. Another example can includes the host application processing the IVs before or after transmitting the data to the card. This is not a security issue if the host application is trusted to provide the IVs. The method eliminates bringing in the IVs and, because the DES chip has a default IV of zeros after reset, eliminates loading the IVs.

According to another embodiment of the present invention, per-operation overhead may be reduced by redesigning the FIFOs and the state machine. By modifying the DES engine to expect data-input to include parameters interleaved with data, then the per-operation overhead $C_2$ may approach the per-byte overhead $C_3$. The state machine handles fewer output bytes than input bytes and the CPU controls the class of engine operations over which the parameters, for example, chosen externally, are allowed to range. For example, the external entity:may be allowed to choose only certain types of encryption operations. Further, the CPU may insert indirection on the parameters the external entity chooses and the parameters the engine see, e.g., the external entity provides an index into an internal table.

Having described embodiments of a system and method of cryptography, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set forth in the appended claims.

What is claimed is:

1. A computer readable medium embodying instructions executable by a processor to perform a method for a symmetric key cryptographic method for a plurality of operations, the method steps comprising:

batching a plurality of operation parameters;

calling data encryption for the plurality of operations corresponding to a batch of the plurality of operation parameters;

reading the batch of the plurality of operations parameters into memory, wherein the batch does not include data; and performing the plurality of operations corresponding to the batch of the plurality of operation parameters individually, wherein performing the plurality of operations comprises reading the batched parameters from the memory, and transmitting each operation through a data encryption standard (DES) engine according to the operations parameter, wherein a first-in-first-out (FIFO) state machine transmits the data for each operation to the DES engine individually and separately from the batch for an external-external DES operation.

2. The computer readable medium of claim 1, wherein the symmetric key cryptographic method is a Data Encryption Standard (DES) method.

3. The computer readable medium of claim 1, wherein the plurality of operations are less than about 80 bytes.

4. The computer readable medium of claim 1, wherein the plurality of operations are between 8 and 80 bytes.

5. A computer readable medium embodying instructions executable by a processor to perform a method improved DES short operation throughput, the method steps comprising:

batching a plurality of operation parameters, each operation parameter corresponding to an operation;

reading the batched operation parameters into a dynamic random access memory; and transmitting each operation through a DES engine according to the operations parameter, wherein transmitting each operation through the DES engine comprises supplying data for each operation individually and separately from the batched operation parameters to the DES engine, wherein the DES is external-to-external and an output for each operation is transmitted separately.

6. The computer readable medium of claim 5, wherein the short operation is less than about 80 bytes.

7. The computer readable medium of claim 5, wherein the short operation is between 8 and 80 bytes.

* * * * *